United States Patent [19]

Yoshida et al.

[11] Patent Number: 4,465,353

[45] Date of Patent: Aug. 14, 1984

[54] ELECTRONIC FLASH DEVICE

[75] Inventors: Masaaki Yoshida; Hiroyuki Kataoka, both of Tokyo, Japan

[73] Assignee: Canon Kabushiki Kaisha, Tokyo, Japan

[21] Appl. No.: 448,744

[22] Filed: Dec. 10, 1982

[30] Foreign Application Priority Data

Dec. 28, 1981 [JP] Japan .................................. 56-211332
Jul. 21, 1982 [JP] Japan .................................. 57-125825

[51] Int. Cl.³ ............................................ G03B 15/05
[52] U.S. Cl. ...................................... 354/415; 354/423
[58] Field of Search .................. 354/32, 33, 34, 35, 354/60 F, 126, 132, 139, 145, 149, 40, 41, 42, 43, 44, 415, 423

[56] References Cited

U.S. PATENT DOCUMENTS 3,823,410  7/1974  Tokutomi et al. .................... 354/33
4,242,616 12/1980  Takematsu .......................... 354/132
4,327,978  5/1982  Ishida et al. ........................ 354/41
4,367,023  1/1983  Ishida et al. ...................... 354/60 F

FOREIGN PATENT DOCUMENTS 2004046  3/1979  United Kingdom ................ 354/145

Primary Examiner—Russell E. Adams
Attorney, Agent, or Firm—Toren, McGeady and Stanger

[57] ABSTRACT

An electronic flash device including a main light part, a pre-emission light part, an illumination direction changing mechanism for changing the illumination directions of the main light part and the pre-emission light at the same time in the case of bounced light photography, and a control mechanism for deciding the aperture value of the photographing lens in accordance with the light measuring level of the reflected pre-emission light and controlling the main light part with the light adjusting level corresponding to the aperture value.

9 Claims, 11 Drawing Figures

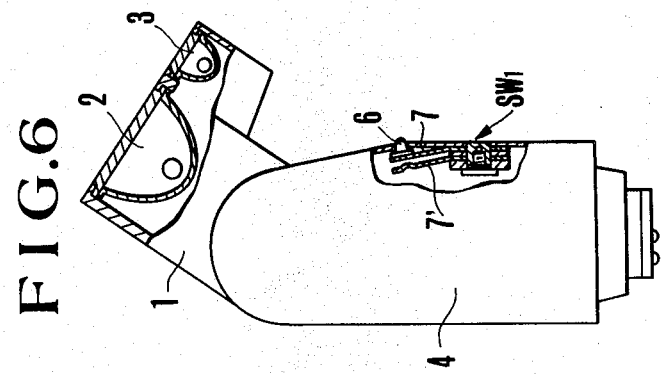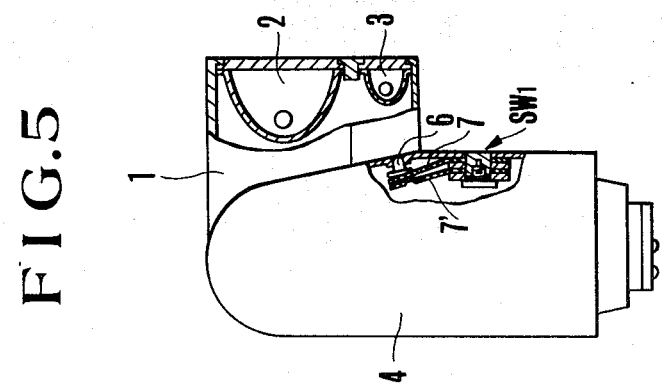

ELECTRONIC FLASH DEVICE

BACKGROUND OF THE INVENTION

1. Field of the Invention

The present invention relates to an electronic flash device for camera photography, particularly an improvement of an electronic flash light device which decides the aperture value with the pre-emission light and sets the light adjusting level of the main light in accordance with the aperture value. Hereby, the light adjusting level is a certain determined amount of received light for stopping the main light.

2. Description of the Prior Art

It is well known that when flash light photography is performed with the light emitting part of the flash light directed to the object, the distance between the light emitting part and the object becomes large so that the amount of light reaching the object is decreased. When the illumination direction of the light emitting part is changed, namely in so-called bounced light photography, the object is illuminated with light via a reflecting surface.

When the illumination direction of the main light emitting part is changed so as to bounce the flash light in order to carry out bounced light photography using an electronic flash light device which decides the aperture value of the photographing lens in accordance with the sensed amount of the reflected pre-emission light and which controls the main light with the light adjusting level corresponding to the aperture value, as mentioned above, the distance to the object becomes large when the main light emitting part is directed to the object so that the amount of light reaching the object is decreased. When at this time the pre-emission lighting is carried out in the same way as in ordinary flash light photography, the aperture value of the photographing lens is decided corresponding to the light measuring level of the reflected pre-emission light so that there is a shortage of light depending upon the distance to the object even if the object is within the light adjustable range, which is a problem.

Therefore it is, an object of the present invention to provide an improved electronic flash device which obviates the disadvantages of prior art devices.

It is another object of the present invention to provide an electronic flash device, such that when the main light is bounced out at the time of bounced light photography, the pre-emission light is also bounced in such a manner that the aperture value of the photographing lens is set with the pre-emission light always corresponding to the light adjusting photographable range of the main light.

These and further objects and features of the present invention will become apparent from the following detailed description of embodiments thereof taken in conjunction with the accompanying drawings.

SUMMARY OF THE INVENTION

In one form of the invention an electronic flash device has a first body means including a first flash tube for pre-emitting a flash light before a shutter release and a second flash tube for emitting a main flash light when a camera shutter is opened. The first and second flash tubes are adjacently disposed. The second body means is adapted to movably support the first body means so as to emit the flash light to a desired direction. The apparatus also includes circuitry means including a first control circuit for controlling the first flash tube, a first detecting circuit for detecting a quantity of a pre-emitting flash light reflected from an object to be photographed and for producing an aperture setting signal to set the aperture of a camera, a second control circuit for controlling the second flash tube, and a second detecting circuit for detecting a quantity of a main flash light reflected from the object to be photographed and for producing a top signal to stop the main flash light when a proper exposure is obtained under the aperture set in relation to the pre-emission of flash light by the first flash tube.

BRIEF DESCRIPTION OF THE DRAWINGS

FIG. 5 shows a partially broken away side view of the electronic flash device in another embodiment of the present invention in ordinary photography.

FIG. 6 shows a partially broken away side view in bounced light photography.

DESCRIPTION OF THE PREFERRED EMBODIMENTS

The present invention will be explained below in accordance with the accompanying drawings of the embodiment hereof.

Figure 1:
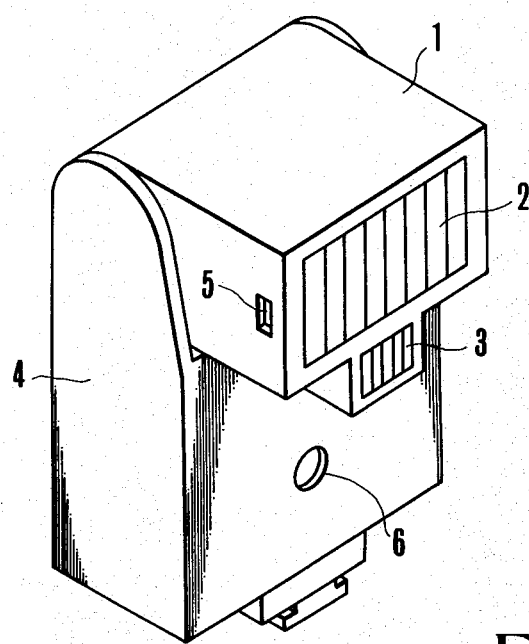
FIG. 1 shows an embodiment of the electronic flash light device of the present invention.

FIG. 1 is a perspective view of an embodiment of the electronic flash device of the present invention. In the drawing, the first body 1 comprises a main light emitting part 2 and a pre-light emitting part 3, reference numeral 4 identifies a second part, whereby the first body 1 and the second part 4 are rotatable at the joint part. Thus, at the time of bounce photography the main light emitting part 2 and the pre-light emitting part 3 are always directed in the same direction. The concave parts 5 are at both sides of the main light emitting part 2 for mounting the wide angle adapter and so on. The light sensing window 6 receives the main flash light and the pre-flash light reflected from the object.

Figure 2:
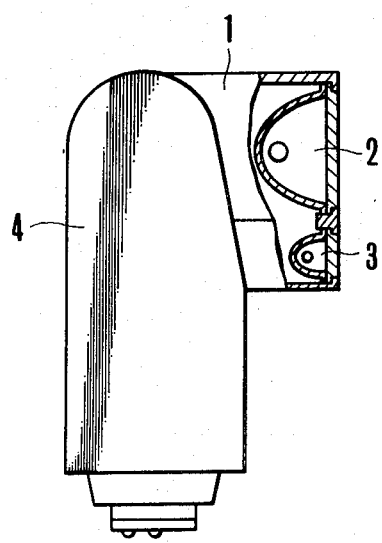
FIG. 2 shows a partially broken away side view of the device during ordinary photography.
Figure 3:
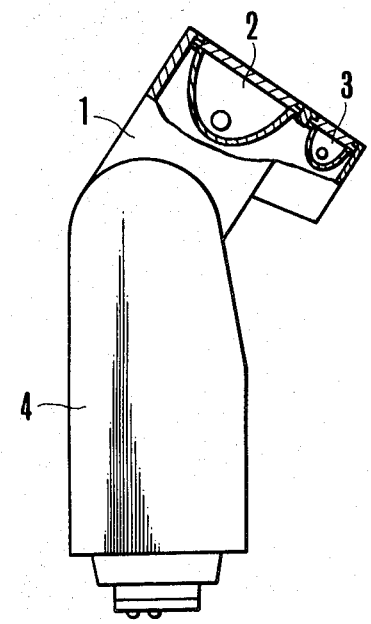
FIG. 3 shows a partially broken-away side view of the device during bounced light photography.

FIGS. 2 and 3 are partly broken away side views of the electronic flash device, whereby the main light emitting part 2 and the pre-light emitting part 3 are shown in section. FIG. 2 shows the flash light device directed to the object, while FIG. 3 shows the device at the time of bounce photography.

Figure 4:
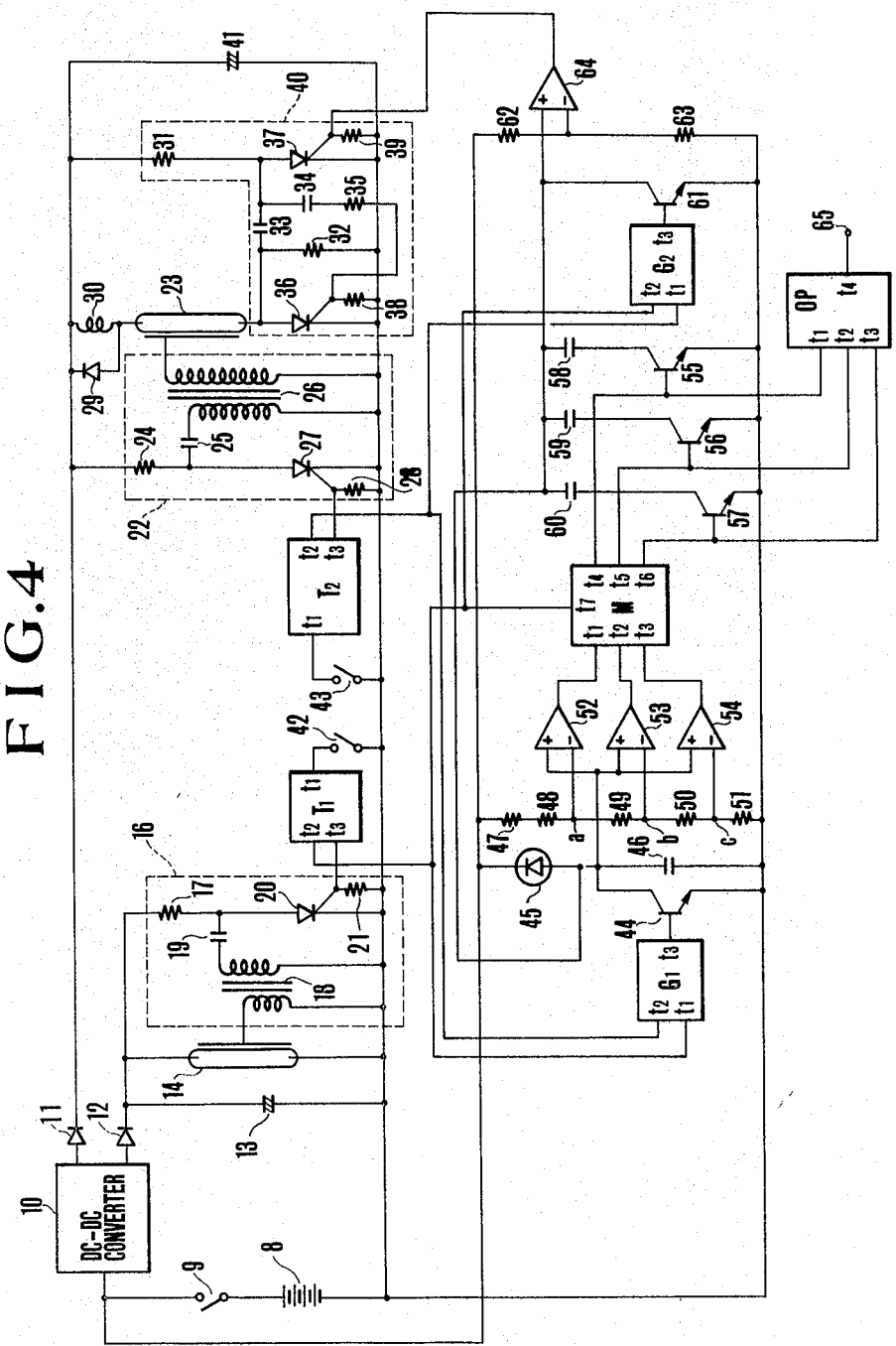
FIG. 4 shows an electric circuit of the electronic flash device in an embodiment of the present invention.

FIG. 4 shows the electrical circuit of the embodiment in FIGS. 1–3. In the drawing, reference numeral 8 identifies a battery, reference numeral 9 identifies a power switch, an DC-DC converter 10 steps up the DC voltage, reference numerals 11, 12 identify diodes and a capacitor 13 has a comparatively small capacity for dividing a pre-light emitting discharge tube 14. A conventional trigger circuit 16 consists of a resistance 17, a trigger transformer 18, a trigger capacitor 19, a trigger thyristor 20 and a resistance 21. A conventional trigger circuit 22 triggers a main flash light discharge tube 23 consisting of a resistance 24, a trigger capacitor 25, a trigger transformer 26, a trigger thyristor 27 and a resistance 28. A diode 29 is inversely connected in series with the main flash light discharge tube 23 and in parallel with an inductor 30. Reference numerals 31, 32 identify charge resistances for a commutating capacitor 33, a capacitor 34 is connected to the gate of a main thyristor 36 via a resistance 35, a subsidiary thyristor 37 and resistances 38, 39, whereby they constitute the light amount control circuit 40. A main capacitor 41 has a larger capacity than that of the capacitor 34 for driving the main flash light discharge tube 23. A switch 42 is closed with the first stroke of the shutter release button, a synchronization switch 43 is closed in synchronization with the shutter release, a timer circuit T1 for pre-lighting, a timer circuit T2 for the main flash light, a gate circuit G1 for opening the transistor 44 with a high level input signal from the timer circuits T1 and T2, a light sensing element 45 for sensing the light reflected from the object, an integrating capacitor 46 which is changed with the photo current from the light sensing element 45, voltage dividing resistances 47-51, comparators 52-54, memory circuits M, transistors 55-57, integrating capacitors 58-68 and a gate circuit G2 for producing a low level signal with the high level input signal from the timer circuit T1 or T2, a transistor 61 to be opened and closed with the output of the gate circuit G2, voltage dividing resistances 62, 63, a comparator 64 for opening the subsidiary thyristor 37, a diaphragm control signal producing circuit OP and a terminal 65 for delivering the diaphragm control signal producing circuit OP.

Below, the operation of the above circuit will be explained. When the object is directly illuminated for ordinary photography, the main light emitting part 2 of the flash light device is as shown in FIG. 2, while in bounce photography the light emitting part 2 is directed in the main devised direction shown in FIG. 3. When the power source switch 9 is closed, the pre-lighting capacitor 13 is charged with a voltage sufficiently high for actuating the pre-light discharge tube 14 within a comparatively short time by the DC-DC converter 10. When the switch 42 is closed with the first stroke of the shutter release button, the level of terminals t2 and t3 of the timer circuit T1 becomes high for a determined time. When the level of the terminal t3 becomes high the conventional trigger circuit 16 operates to let the pre-lighting discharge tube 14 start to discharge. On the other hand, when a high level signal is delivered from the terminal t2 to the terminal t2 of the gate circuit G1, the level of the terminal t3 of the gate circuit G1 becomes low, the transistor 44 is opened and the integrating capacitor 46 is ready to be charged. The light sensing element 45 converts the light reflected from the object into electric current and charges the integrating capacitor 46. The charge voltage of the integrating capacitor 46 is proportional to the integrated value of the light reflected from the object. It goes without saying that the charge voltage differs between bounce photography and ordinary photography.

The potentials at voltage dividing points a-c of the voltage dividing resistances 47-51 are determined corresponding to close-ups, median range and long distance of the object. For example, in long distance, the charge voltage of the integrating capacitor 46 is higher than the potential at the voltage dividing point c and lower than that at the voltage dividing point b when pre-lighting is finished. Thus, only the comparator 54 delivers a high level signal. In the close-ups, the comparators 53 and 54 deliver high level signals, while in close-ups all of the comparators 52-54 deliver high level signals. When the level of the input from the terminal t2 of the pre-lighting timer circuits T1 to a terminal t7 of the memory circuit M changes from high to low after the lapse of a determined time, the memory circuit M memorizes the input levels of the terminals t1-t3 closing one of the transistors 55-57 according to the input levels. For example, when the output level of the comparators 52-54 is high, the transistor 55 is closed so as to select the integrating capacitor 58 for close-ups. At the same time, depending on which of the transistors 55-57 is closed, the diaphragm control signal producing circuit OP produces the diaphragm control signal to be delivered from the terminal 65 to the camera side changing the lens diaphragm according to the object distance. In bounce photography the corresponding aperture value is set.

Then when the synchronization contact 43 is closed with the shutter release, the level of the terminals t2 and t3 of the main flash timer circuit T2 is high for a determined time. When the level of the terminal t3 is high, the conventional trigger circuit 22 operates, discharging the main flash light discharge tube 23. On the other hand, when a high level is delivered from the terminal t2 to the terminal t1 of the gate circuit G2, the level of the terminal t3 becomes low and the transistor 65 opens. Thus, one of the integrating capacitors 58-60 selected by the memory circuit M is ready to be charged. In bounce photography the corresponding integrating capacitor is selected. When the light sensing element 45 serves the flash light from the main flash light discharge tube 23, reflected from the object, the reflected flash light is converted into an electric current and charges one of the integrating capacitors 58-60, selected by the memory circuit M. When the charge voltage of the integrating capacitor 58-60 becomes higher than that at the voltage dividing point of the voltage dividing resistances 62, 63, a high level signal is delivered from the comparator 64 to the subsidiary thyristor 37 so that the subsidiary thyristor 37 is closed and the main thyristor 36 is inversely biased by the charge changed in the commutating capacitor 33, opening the main thyristor 36 and stopping the discharge of the main flash light discharge tube 23. Thus, a proper exposure can be obtained both for bounce photography and ordinary flash light photography.

Furthermore, although when the high level signal from the terminal t2 of the main flash timer circuit T2 is delivered to the gate circuit G1, the transistor 44 opens and the integrating capacitor 46 is charged with the current flowing through the light sensing element 45, the loss due to charging of the integrating capacitor 46 can be reflected because the capacity of the integrating capacitor 46 is remarkably smaller than that of the integrating capacitors 58-60.

Ultra red light is used as pre-lighting in order that the object not be dazzling. This will be explained in accordance with FIGS. 5-7. The ultra red light here includes the near ultra red one.

The wave length of ultra red light is longer than that of visible light so that it is difficult to be dispersed on the reflecting surface and therefore when it is bounced, the loss of light reaching the object is smaller than that of the main flash light. Thus, the set aperture value for pre-lighting does not coincide with the photographable range of the main flash light, whereby in accordance with the distance to the object there is a shortage of light, which is inconvenient. This difficulty is solved by the present embodiment.

FIGS. 5 and 6 show a partially broken away side view of another embodiment of the electronic flash light device of the present invention. In the drawing the main flash light emitting part 2 and the pre-light emitting part 3 for emitting the ultra red light are shown in partial section and the switch SW1 is closed and opened by operational engagement of the rotation of the first body 1 with reference to the second body 4 so as to adjust the pre-light amount. FIG. 5 shows the device directed toward the object. In the drawing the push button 6 is depressed by the first body 1 so that electric contacts 7 and 7' are in contact with each other so that the pre-light amount is not adjusted.

FIG. 6 shows bounce photography. The push button 6 is not depressed by the first body 1 so that the electric contracts 7 and 7' are not in contact and decrease the amount of pre-light.

Figure 7:
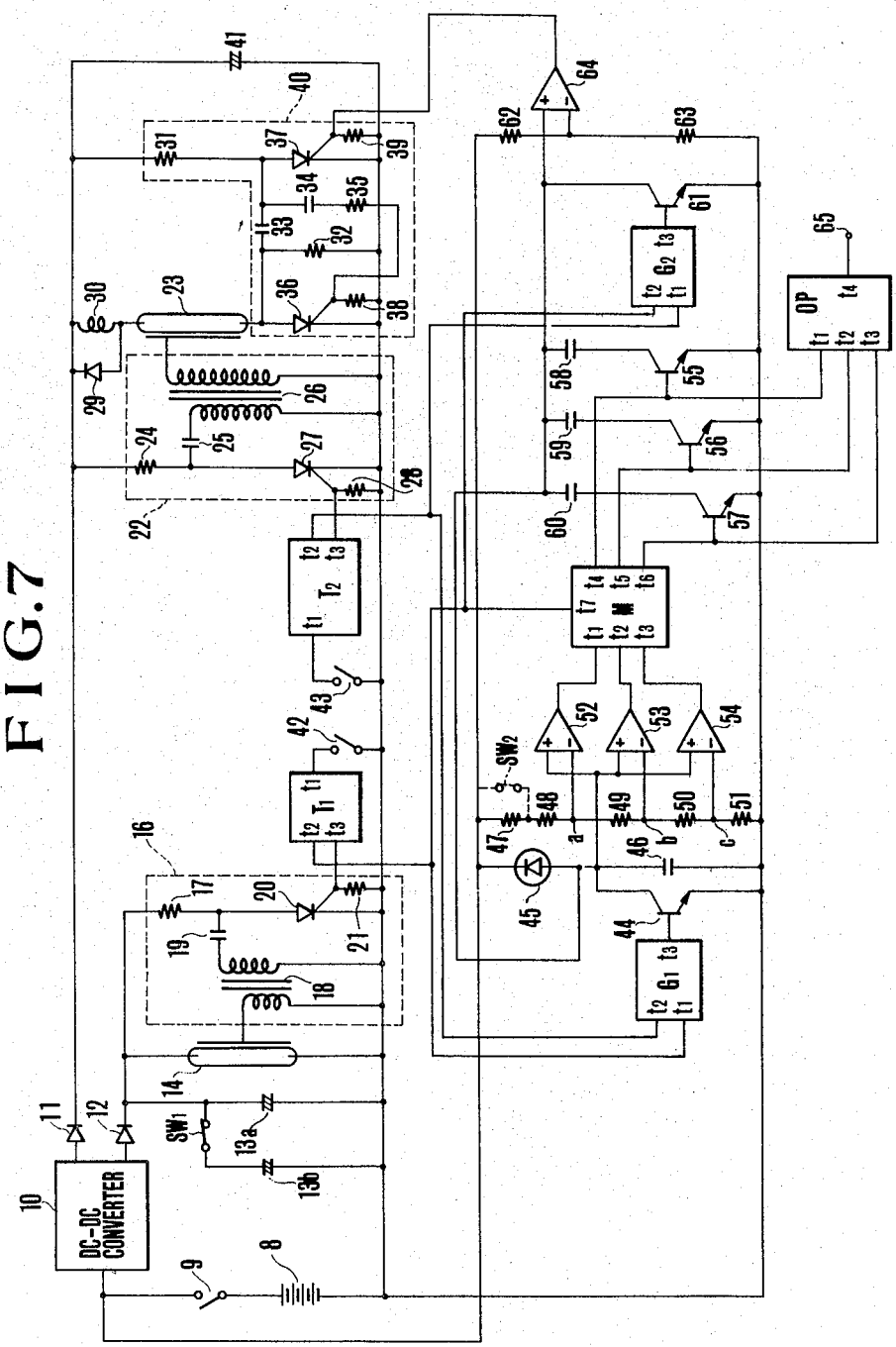
FIG. 7 shows an electric circuit of the electronic flash device in the FIG. 5 embodiment of the present invention.

FIG. 7 shows the circuit of the present embodiment. The construction is almost the same as that shown in FIG. 4. The difference lies in the fact that the pre-light discharge tube 14 emits the ultra red light and the pre-light amplifying capacitor 13b is connected in parallel with the pre-light capacitor 13a via the above switch SW1. Hereby, the sum of the capacity of the capacitor 13a and that of the capacitor 13b is equal to the capacity of the pre-light capacitor 13 in FIG. 4.

Below, the operation of the above embodiment will be explained.

In ordinary photography, when the object is illuminated directly, the switch SW1 is closed as shown in FIG. 5. Thus, the operation of the circuit is the same as that in FIG. 4 so that the explanation is omitted here.

When the object is illuminated indirectly, the switch SW1 is opened (FIG. 6) and the pre-light amount is smaller. Because the dispersion of the ultra red light on the bounce surface is small, the amount of light on the object is not decreased and corresponds to the main light amount. Below, the operation is the same as when the switch SW1 is closed so that the explanation is omitted.

In FIG. 7, when the switch SW1 is opened for bounce photography, the pre-light amplifying capacitor 13b is off to lower the level for measuring pre-light, whereby, as shown in a dotted line in FIG. 7, it is possible that the switch SW2 is provided in parallel with the voltage dividing resistance 47 in such a manner that at the time of bounce photography the switch SW2 is closed to raise the standard voltages of the comparators 52-54, namely the potentials at the voltage dividing point a, b and c and thus lower the level for measuring the pre-light.

FIGS. 8-11 show a variation of the embodiment in FIGS. 5-7.

Figure 8:
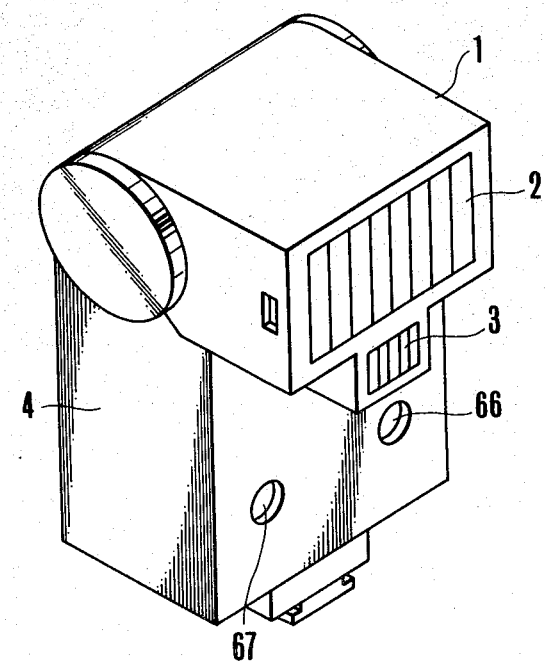
FIG. 8 shows a side view of a variation of the above embodiment.

In the present variation, by providing a filter or the like in front of the light sensing element for the pre-light in bounce photography the level for measuring the pre-light is lowered. The members having the same figures as those in FIGS. 1-7 are the same members. As is shown in FIG. 8, in front of the second body 4 a main light sensing window 66 and a pre-light sensing window 67 are provided separately.

Figure 9:
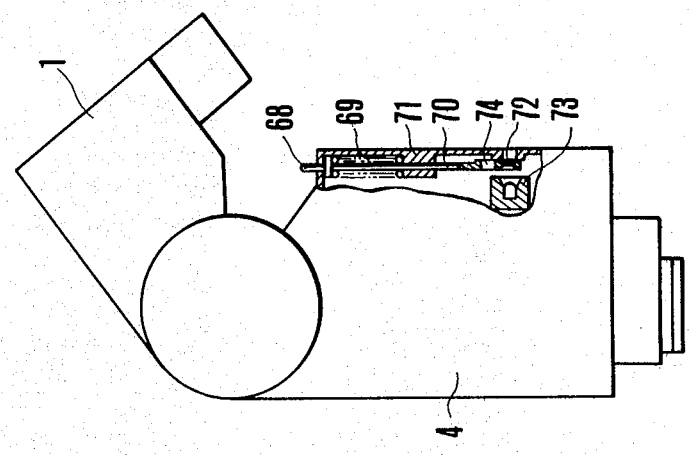
FIG. 9 shows a partially broken away side view of the above embodiment in ordinary photography.

FIG. 9 shows in ordinary photography that the object is directly illuminated. A depression pin 68 is pressed down against a spring 69 by the first body 1 and a rod 70 making one body with the pin 68 which is also lowered, being guided by a guide 71. A filter 72 at the lower end of the guide 71 moves downwards from the front of a pre-light sensing element 73, while a transparent part 74 comes to the front of the pre-light sensing element 73.

Figure 10:
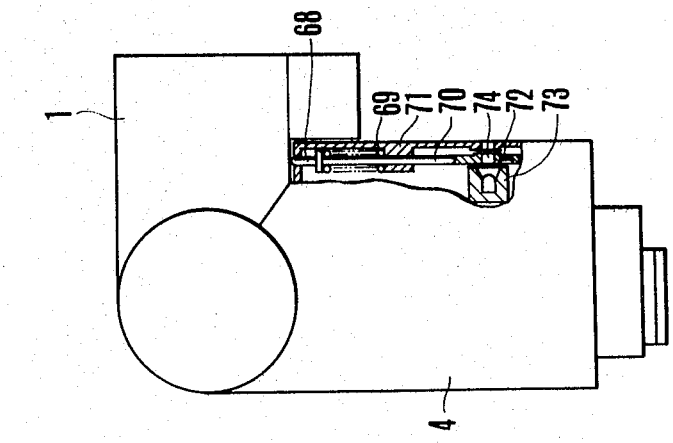
FIG. 10 shows a partially broken away side view of the above embodiment in bounced light photography.

FIG. 10 shows bounce photography in which the object is illuminated indirectly. The rod 70 is pushed up by the spring 69 so that the filter 72 is in front of the pre-light sensing element 73 so as to decrease the sensed amount of pre-light.

Figure 11:
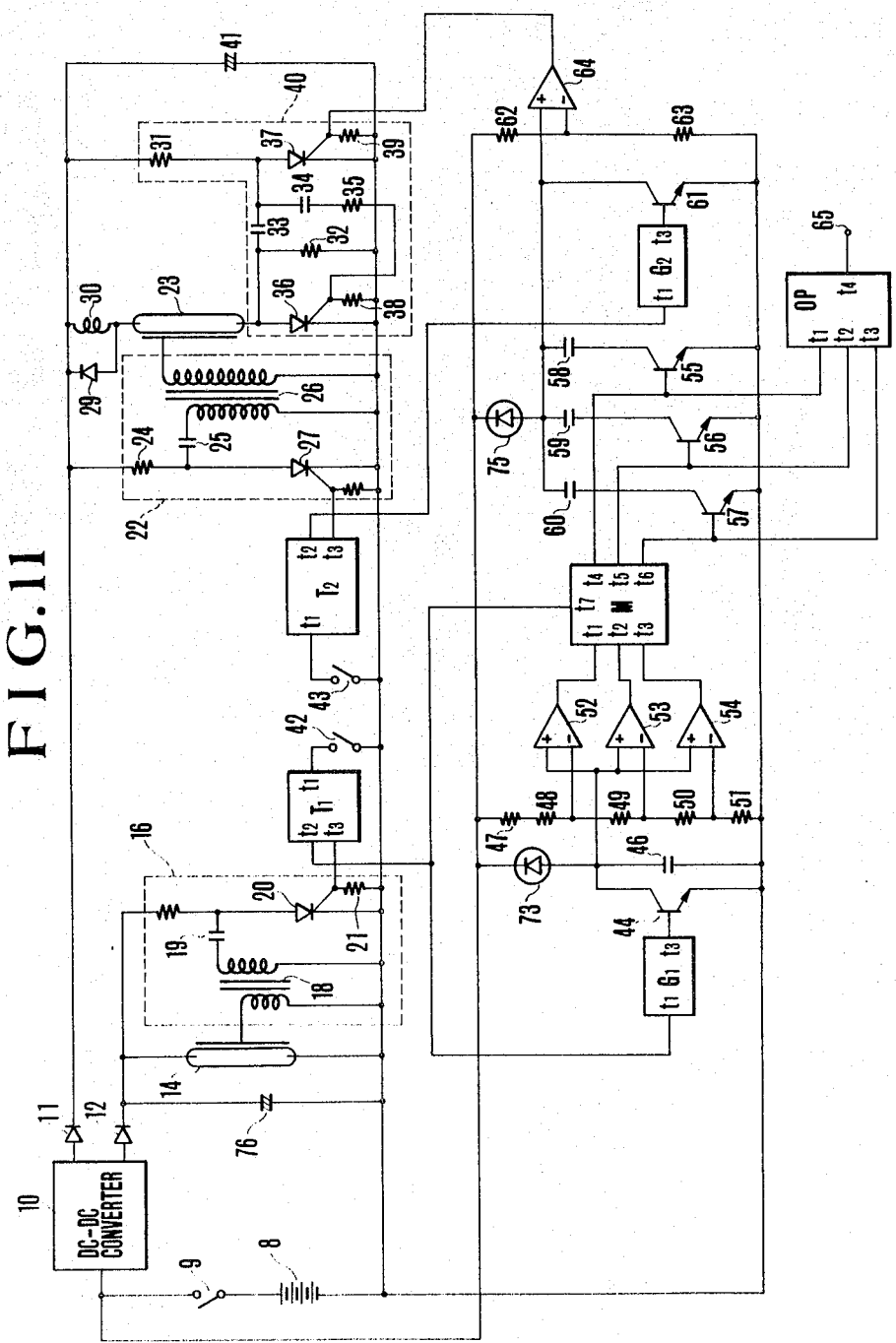
FIG. 11 shows an electrical circuit of the above embodiment.

FIG. 11 shows the electric circuit. A main light sensing element 75 and the pre-light sensing element 73 are provided separately. The capacity of a pre-light capacitor 76 is equal to the sum of the pre-light capacitor 13a and that of the pre-light amplifying capacitor 13b shown in FIG. 7, namely that of the pre-light capacitor 13 in FIG. 4. The operation of the circuit in FIG. 11 is the same as that of the circuit in FIG. 4 so that the explanation is omitted here.

Hereby, the means for lowering the light measuring level is not limited to the embodiments in the drawing, whereby it is possible to change over to the pre-light integrating capacitor with a large capacity in accordance with a change of illumination direction.

As mentioned above in accordance with the present invention the main light part and the pre-light part are constructed as one body. During bounce photography the main light part and the pre-light part are rotated at the same time and in the same way as in ordinary photographing. Flash light photography with the aperture value set for pre-lighting is made possible in the comparator photographable range, while the main light part and the pre-light part are directed by the illumination direction changing means in the direction along which the object is illuminated indirectly in such a manner that by providing the means for lowering the level for measuring the reflected pre-light the difference between the lost amount of ultra red light used as the pre-light and that of the main light on the bounce surface is compensated so that even when ultra red light is used as the pre-light for bounce photography light shortage, depending upon the distance to the object, can be prevented and the operation is the same as that at the time of ordinary photography, which is effective.

What we claim:

1. A flash device for carrying out preliminary illumination to determine an aperture value for flash photography prior to the making of an exposure, and a main illumination for taking a photograph, comprising:
    (a) a body having displaceably mounted thereon a light source for said preliminary illumination and said main illumination, said body being provided with a light sensor for receiving the reflected light from an object to be photographed with said preliminary illumination, and said light source being displaceable relative to said body from a normal shooting position for direct flash photography to a bounce shooting position for bounce flash photography;

(b) a detecting circuit for detecting the reflected light due to said preliminary illumination received by said sensor, said circuit being receptive of the reflected light due to said preliminary illumination for determining said aperture value for flash exposure; and (c) correcting means for lowering the sensitivity of a detecting operation of the reflected light by said detecting circuit when in bounce flash photography.

2. A flash device for carrying out preliminary illumination to determine an aperture value for flash photography prior to the making of an exposure, and a main illumination for taking a photograph, comprising:

(a) a body having displaceably mounted thereon a light source for said preliminary illumination and said main illumination, said body being provided with a light sensor for receiving the reflected light from an object to be photographed with said preliminary illumination, and said light source being displaceable relative to said body from a normal shooting position for direct flash photography to a bounce shooting position for bounce flash photography;

(b) a detecting circuit for detecting an integration level of the reflected light due to said preliminary illumination received by said light sensor to determine an aperture value for flash exposure; and (c) correcting means for increasing the critical level for integration of the reflected light by said detecting circuit when in bounce light photography from a value when in direct light photography.

3. A flash device for carrying out preliminary illumination to determine an aperture value for flash photography prior to the making of an exposure, and a main illumination for taking a photograph, comprising:

(a) a body having displaceably mounted thereon a light source for said preliminary illumination and said main illumination, said body being provided with a light sensor for receiving the reflected light from an object to be photographed with said preliminary illumination, and said light source being displaceable relative to said body from a normal shooting position for direct flash photography to a bounce shooting position for bounce flash photography;

(b) a detecting circuit for detecting the reflected light due to said preliminary illumination received by said sensor, said circuit being receptive of the reflected light due to said preliminary illumination for determining said aperture value for flash exposure; and (c) correcting means for lowering the intensity of said preliminary illumination when in bounce light photography from that when in direct light photography.

4. A flash device for carrying out preliminary illumination to determine an aperture value for flash photography prior to the making of an exposure, and a main illumination for taking a photograph, comprising:

(a) a body having displaceably mounted thereon a light source for said preliminary illumination and said main illumination, said body being provided with a light sensor for receiving the reflected light from an object to be photographed with said preliminary illumination, and said light source being displaceable relative to said body from a normal shooting position for direct flash photography to a bounce shooting position for bounce light photography;

(b) a detecting circuit for detecting the reflected light due to said preliminary illumination received by said sensor, said circuit being receptive of the reflected light due to said preliminary illumination for determining said aperture value for flash exposure; and (c) a light intensity lowering element for lowering the intensity of light incident on said light sensor when in bounce flash photography from that when in direct flash photography.

5. A flash device according to claim 1, 2, 3 or 4, wherein said preliminary illumination is of infrared or near infrared light.

6. A flash device for carrying out preliminary illumination to determine an aperture value for flash photography prior to the making of an exposure, and a main illumination for taking a photograph, comprising:

(a) a body having displaceably mounted thereon a light source for said preliminary illumination and said main illumination, said body being provided with a light sensor for receiving the reflected light from an object to be photographed with said preliminary illumination, and said light source being displaceable relative to said body from a normal shooting position for direct flash photography to a bounce shooting position for bounce flash photography;

(b) a detecting circuit for detecting the reflected light due to said preliminary illumination received by said light sensor to determine an aperture value for flash exposure; and (c) adjusting means for adjusting a reflected light detecting operation of said detecting circuit for bounce flash photography to the detecting operation for the direct flash photography in order to compensate for the difference between the reflected light characteristics from the object to be photographed when in the bounce shooting mode.

7. A flash device according to claim 6, wherein said preliminary illumination is of infrared or near infrared light.

8. A flash device for carrying out preliminary illumination to determine an aperture value for flash photography prior to the making of an exposure, and a main illumination for taking a photograph, comprising:

(a) a body having displaceably mounted thereon a light source for said preliminary illumination and said main illumination, said body being provided with a light sensor for receiving the reflected light from an object to be photographed with said preliminary illumination, and said light source being displaceable relative to said body from a normal shooting position for direct flash photography to a bounce shooting position for bounce flash photography; and (b) an adjusting circuit receptive of the reflected light with the preliminary illumination received by said light sensor for determining an aperture value for flash photography and receptive of the reflected light with the main illumination for adjusting the amount of the main illumination based on the detection of the reflected light due to said preliminary illumination.

9. A flash device according to claim 8, wherein said light sensor is provided with first and second photosensitive elements, and said adjusting circuit detects the reflected light with preliminary illumination by said first photosensitive element, and the reflected light with the main illumination by said second photosensitive element.

* * * * *